United States Patent
Morin et al.

(10) Patent No.: US 8,510,660 B2
(45) Date of Patent: Aug. 13, 2013

(54) METHOD AND SYSTEM FOR TAGGING CONTENT

(75) Inventors: David B. Morin, San Francisco, CA (US); Dustin R. Mierau, San Francisco, CA (US); Matthew Van Horn, San Francisco, CA (US); Daniel S. Dofter, San Francisco, CA (US); Mark Lewandowski, San Francisco, CA (US); Daniel Trinh, San Francisco, CA (US); Michael Jackson, San Francisco, CA (US); Lowell Kirsh, San Francisco, CA (US); Matthew M. Matteson, San Francisco, CA (US); Jon Crosby, San Francisco, CA (US)

(73) Assignee: Path, Inc., San Francisco, CA (US)

( * ) Notice: Subject to any disclaimer, the term of this patent is extended or adjusted under 35 U.S.C. 154(b) by 329 days.

(21) Appl. No.: 12/945,738

(22) Filed: Nov. 12, 2010

(65) Prior Publication Data

US 2012/0124479 A1     May 17, 2012

(51) Int. Cl.
*G06F 3/00*     (2006.01)
*G06F 7/00*     (2006.01)
*G06F 17/30*     (2006.01)
*G06F 15/16*     (2006.01)
*G06F 15/173*     (2006.01)

(52) U.S. Cl.
USPC ........... 715/738; 715/741; 715/744; 715/753; 715/866; 707/737; 707/784; 709/217; 709/219; 709/223; 709/225

(58) Field of Classification Search
USPC ......... 715/741, 744, 738, 753, 866; 707/737, 707/784; 709/217, 219, 223, 225
See application file for complete search history.

(56) References Cited

U.S. PATENT DOCUMENTS

| | | | |
|---|---|---|---|
| 2004/0042599 A1* | 3/2004 | Zaner et al. | 379/144.01 |
| 2004/0125133 A1* | 7/2004 | Pea et al. | 345/751 |
| 2004/0221244 A1* | 11/2004 | Baldino | 715/835 |
| 2005/0160167 A1* | 7/2005 | Cheng et al. | 709/224 |

(Continued)

OTHER PUBLICATIONS

"'My Visitors'—Myspace has launched a tracker!" published on Sep. 23, 2010, and retrieved from http://she-geeks.com/forum/myspace-trackers/'myvisitor'-myspace-has-launched-a-tracker!-o/?action=printpage retrieved on Nov. 14, 2012.*

"PICASA Web Albums Shows the Number of Views," published on Jul. 13, 2009, and retrieved from http://googlesystem.blogspot.com/2009/07/picasa-web-albums-shows-number-of-views.html on Nov. 14, 2012.*

(Continued)

*Primary Examiner* — Kieu Vu
*Assistant Examiner* — Eric J Bycer
(74) *Attorney, Agent, or Firm* — Fenwick & West LLP (57) ABSTRACT

Systems and methods for tagging digital content are provided. In some embodiments, a method comprises receiving and storing personal data of a first user of an internet-based social network. The personal data of the first user can include one or more digital images or other digital content that the first user is willing to share with other users of the social network. Accordingly, a request from a second user of the internet-based social network can be received to view some of the digital content of the first user. A viewer image can be used to tag the digital content of the first user allowing the owner of the digital content to quickly determine the viewers. The viewer image can be a personal profile picture, an image, an icon, an avatar (two-dimensional or three-dimensional), or other on-screen representation that includes a visual indicator of the second user.

29 Claims, 5 Drawing Sheets

(56) References Cited

U.S. PATENT DOCUMENTS

| | | | |
|---|---|---|---|
| 2005/0165893 A1* | 7/2005 | Feinberg et al. | 709/205 |
| 2006/0004914 A1* | 1/2006 | Kelly et al. | 709/219 |
| 2006/0026593 A1* | 2/2006 | Canning et al. | 718/100 |
| 2007/0067405 A1* | 3/2007 | Eliovson | 709/206 |
| 2007/0118794 A1* | 5/2007 | Hollander et al. | 715/512 |
| 2007/0276676 A1* | 11/2007 | Hoenig et al. | 705/1 |
| 2008/0065701 A1* | 3/2008 | Lindstrom et al. | 707/201 |
| 2008/0091771 A1* | 4/2008 | Allen et al. | 709/203 |
| 2008/0222531 A1* | 9/2008 | Davidson et al. | 715/736 |
| 2008/0307320 A1* | 12/2008 | Payne et al. | 715/751 |
| 2009/0024910 A1* | 1/2009 | Kamat et al. | 715/204 |
| 2009/0037454 A1* | 2/2009 | Sampson et al. | 707/102 |
| 2009/0049070 A1* | 2/2009 | Steinberg | 707/101 |
| 2009/0133081 A1* | 5/2009 | Sakai et al. | 725/105 |
| 2009/0249223 A1* | 10/2009 | Barsook et al. | 715/753 |
| 2010/0037141 A1* | 2/2010 | Carter et al. | 715/733 |

OTHER PUBLICATIONS

"Flickr Help/FAQ/Stats" http://www.flickr.com/help/stats/ retrieved on Nov. 14, 2012 from the Wayback Machine archive Dec. 15, 2007.*

"Online on orkut" published on Jul. 16, 2008 and retrieved on Nov. 14, 2012 from http://www.techfuels.com/web-2-0/4809-online-orkut.html.*

"Using Gravatars" http://codex.wordpress.org/Using_Gravatars retrieved on Nov. 15, 2012 from the Wayback Machine archive Mar. 16, 2009.*

"FAQs & How to's Top Frequently Asked Questions" http://cmd.shutterfly.com/commands/format/html?site=sharecentral&page=sharecentral%2fhelptopicsfaqs retrieved on Nov. 14, 2012 from the Wayback Machine archive Dec. 1, 2009.*

* cited by examiner

METHOD AND SYSTEM FOR TAGGING CONTENT

TECHNICAL FIELD

Various embodiments of the present invention generally relate to content and interactions within information sharing platforms (e.g., a social networking site). More specifically, various embodiments of the present invention relate systems and methods for tagging content found within the information sharing platforms.

BACKGROUND

Social networking and photo sharing sites have become popular for maintaining and expanding relationships. These sites are typically online platforms that are dedicated to building and maintaining the social networks or social relations among people by providing systems for sharing information to many people without taking the time to contact these people directly. In many cases, the relationships are established among users who share experiences, common interests, and/or activities.

Many of these sites allow users to create profiles with a variety of information that can be shared with other users; however, these sites usually have privacy controls that allow users to choose who can view their profile, contact them, etc. Through these profiles, the users can upload pictures and movies, share information about their lives, create blog entries, indicate interests of the user, communicate in real-time with other users, comment on content of users, and the like. For example, social networking sites allow for friends (e.g., high school classmates) to remain connected, interact, and share pictures, home movies, interests, hobbies, favorite movies, favorite books, favorite television shows, and other information about their lives.

Most photo sharing and social network sites and applications use commenting and linking as the form of feedback for interaction among the users. On many sites there are dedicated sections for comments from users. However, the dedicated section for comments and linking found in these sites and applications often do not capture all the information about interactions that a user might desire. As such, there are a number of challenges and inefficiencies found in traditional photo sharing and social networking sites.

SUMMARY

Systems and methods are described for tagging content within an internet-based social network. In some embodiments, a method comprises receiving and storing personal data of a first user of an internet-based social network. The personal data of the first user can include one or more digital images that the first user is willing to share with other users of the social network. Accordingly, a request from a second user of the internet-based social network can be received to view at least one of the one or more digital images of the first user. A viewer image is graphically overlaid on each of the one or more digital images of the first user that were viewed by the second user. The viewer image can be a personal profile picture, an image, an icon, an avatar (two-dimensional or three-dimensional), or other on-screen representation that includes a visual indicator of the second user. In some cases, a request is received from a third user of the internet-based social network to view at least one or more digital images of the first user. A second viewer image can be graphically overlaid on each of the one or more digital images of the first user that were viewed by the third user. The second viewer image also includes a visual indicator of the third user.

In some cases, the viewer image and the second viewer image are aligned around the perimeter of each of the one or more digital images of the first user that were viewed by the second user and the third user. In one or more embodiments details of the second user can be displayed in response to interaction with the viewer image graphically overlaid on one of the one or more digital images of the first user. For example, the details can include the second user's name, screen name, address, e-mail address, telephone number, instant message contact information, relationship status, current location, and/or other details. In some embodiments, comments from the second user regarding the digital image can be displayed in response to the interaction. When the first user selects the viewer image overlaid on one of the one or more digital images of the first user, the first user can be directed to a personal profile page of the second user.

Embodiments of the present invention also include computer-readable storage media containing sets of instructions to cause one or more processors to perform the methods, variations of the methods, and other operations described herein.

Various embodiments of the present invention include a system comprising an account database, a monitoring module, and a tagging module. The account database can be used to store a plurality of user accounts of an internet-based social network. In some embodiments, each of the plurality of user accounts includes a personal profile and a digital image. The monitoring module can be configured to receive and record viewing activity for the digital image included in each of the plurality of user accounts. The recorded viewing activity may include an indicator of a user of the internet-based social network that viewed the digital image. The tagging module can be configured to receive the recorded viewing activity of the digital image and tag the digital image with a viewer image of the user that viewed the digital image.

Some embodiments also include an information module to gather information about the user that viewed the digital image from one of the plurality of user accounts that is associated with the user. The information module can then embed a subset of this information into the viewer image. For example, a link can be embedded within the viewer image to the personal profile of the user that viewed the digital image so that a selection of the viewer image will present the personal profile of the user that viewed the digital image.

Other embodiments of the present invention also include one or more of an image viewing module, an authorization module, a communications module, and/or a graphical user interface generation module. The image viewing module can receive a request from a first user to view the digital image of a second user. The authorization module can be communicably coupled to the image viewing module to allow the authorization module to receive the request. Then, the authorization module can use a set of viewing rules to generate an authorization indicator if the first user is authorized to view the digital image of the second user. When the authorization indicator is received from the authorization module, the digital image of the second user will be displayed.

In some embodiments, the communications module is configured to send the digital image with the viewer image of the user that viewed the digital image to the user via e-mail. The graphical user interface generation module can be used to generate a graphical user interface allowing a first user of the internet-based social network to view the personal profile and the digital image of a second user of the internet-based social network.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to content within information sharing platforms. More specifically, various embodiments of the present invention relate to systems and methods for tagging content (e.g., a picture, a movie, a digital image, a file, or other digital content). Most photo sharing and social network applications use commenting and linking as the form of feedback. In contrast, embodiments of the present invention enable more authenticity and storytelling by tagging content instead of relying on dedicated comment sections. By tagging the content, more information about the user interactions within the platform is able to be captured and relayed to the users.

For example, in some embodiments, personal data of a first user of an internet-based social network are stored. The personal data of the first user can include a variety of digital content such as, but not limited to, one or more digital images, pictures, movies, files, websites, and/or other digital content that the first user is willing to share with other users of the social network. When a second user views a photo or other digital content on an internet-based social network, a database can be used to record that the second user has "seen" the photo or other digital content. The next time the creator or owner of the photo or other digital content visits the photo, a viewer image (e.g., a picture of a face, a profile picture, an image, an icon, an avatar, or other on-screen representation) of friends who have "seen" the photo are displayed on the photo or other digital content.

Views from other users of the social network are also recorded and additional viewer images can be displayed on the photo. In some cases, multiple viewer images are aligned around the perimeter of the digital content. In some cases, the viewer images can be grouped into one or more categories such as friends, family, college classmates, high school classmates, coworkers, and/or others.

In one or more embodiments details of the users that have viewed the digital content can be displayed in response to interaction with the viewer images. For example, the details can include the number of views of the content, length of time viewed, download indicator, a user's name, screen name, address, e-mail address, telephone number, instant message contact information, relationship status, current location, and/or other details. For the group viewer images, the details can include the viewer images of the users, a list of names, etc. In some embodiments, comments from the second user regarding the digital image can be displayed in response to the interaction.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to internet-based social networks, embodiments of the present invention are equally applicable to various other arrangements for sharing digital images and digital content such as blogs, online photo albums or other photo sharing platforms, private websites, networks and online communities, document sharing within businesses or educational institutions, and others.

In addition to digital images, embodiments of the present invention are equally applicable to various other digital content such as e-mails, movies, and documents (e.g., MICROSOFT WORD documents, MICROSOFT EXCEL Documents, MICROSOFT POWERPOINT documents, text documents, pdf's, and others). For example, when a user sends an e-mail to multiple recipients, a viewer image can be inserted into the e-mail indicating which recipients have viewed the e-mail.

For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to mobile communication systems, services, and devices such as cell phone networks and compatible devices. In addition, embodiments are applicable to all levels of computing from the personal computer to large network mainframes and servers.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

Figure 1:
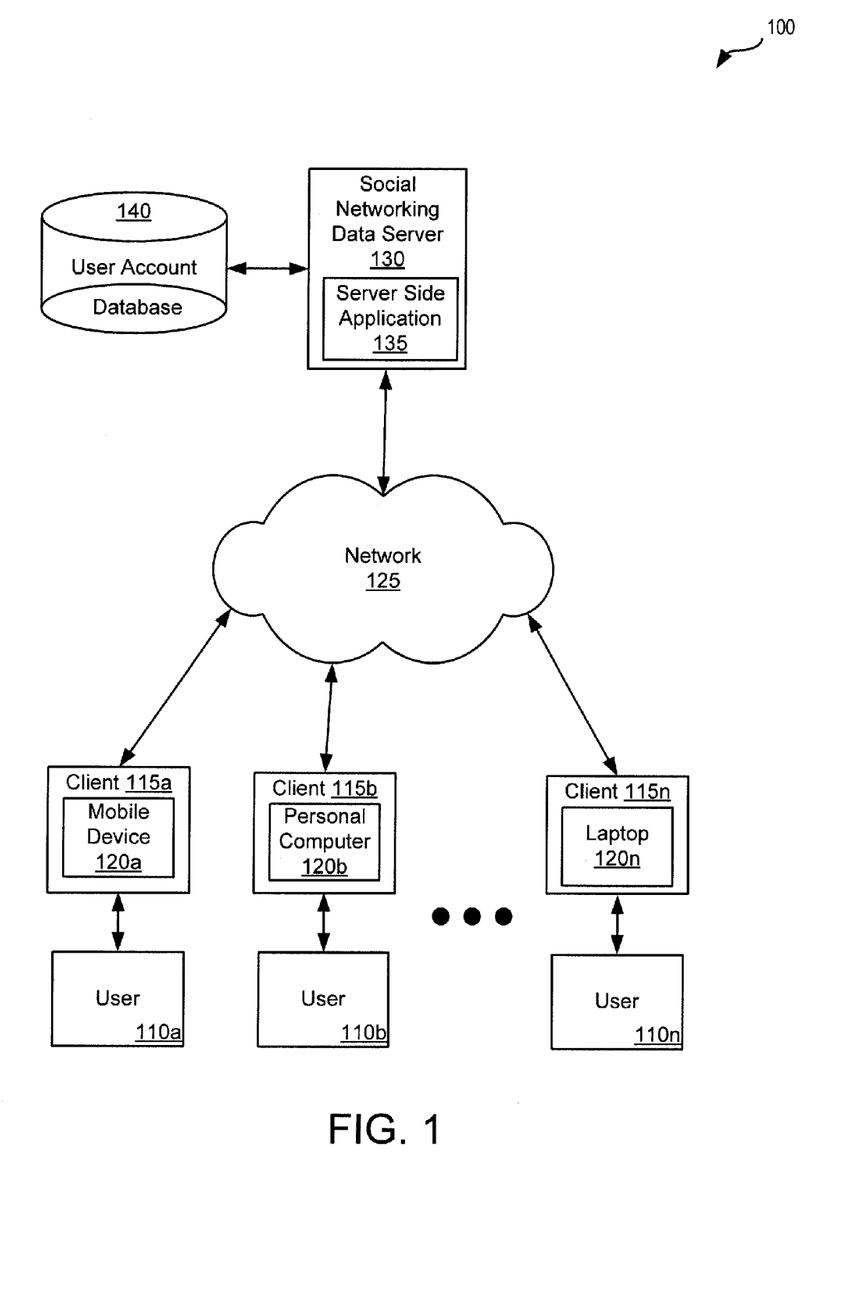
FIG. 1 illustrates an example of an internet-based social networking environment in which some embodiments of the present invention may be utilized.

FIG. 1 illustrates an example of an internet-based social networking environment 100 in which some embodiments of the present invention may be utilized. The embodiments illustrated in FIG. 1 show users 110a-110n running clients 115a-115n on mobile device 120a, personal computer 120b, and laptop 120n. Network 125 connects clients 115a-115n (e.g., webpage or custom application) to social networking data server 130 running server side application 135 which is communicably coupled to user account database 140.

Social networking data server 130 hosts an internet-based the social network site allowing users 110a-110n access through network 125. The social network site allows users 110a-110n to create profiles or user account which can be stored on user account database 140. Each user profile can include a variety of information that can be shared with other users via the social networking site. Through these profiles, the users can upload pictures and movies, share information about their lives, create blog entries, indicate interests of the user, communicate in real-time with other users, comment on content of users, and share other digital information.

Network 125 can be any group of interconnected devices capable of exchanging information. In some embodiments, network 125 may be as few as several personal computers on a Local Area Network (LAN) or as large as the Internet. Network 125 may also be a Voice over Internet Protocol (VoIP) network or a Voice Response Unit (VRU) according to some embodiments of the present invention. In some cases, network 125 may be comprised of multiple networks (private and/or public), even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

However, in some embodiments, social networking data server 130 and user account database 140 are co-located, and could even be integrated. When server side application is servicing multiple clients 115a-115n, the requests could be processed in a first-in, first out (FIFO) manner. In other embodiments, each user application may be associated with a tier of service that could be purchased. As such, the higher tiers would have a higher priority over the lower tiers of service.

Figure 2:
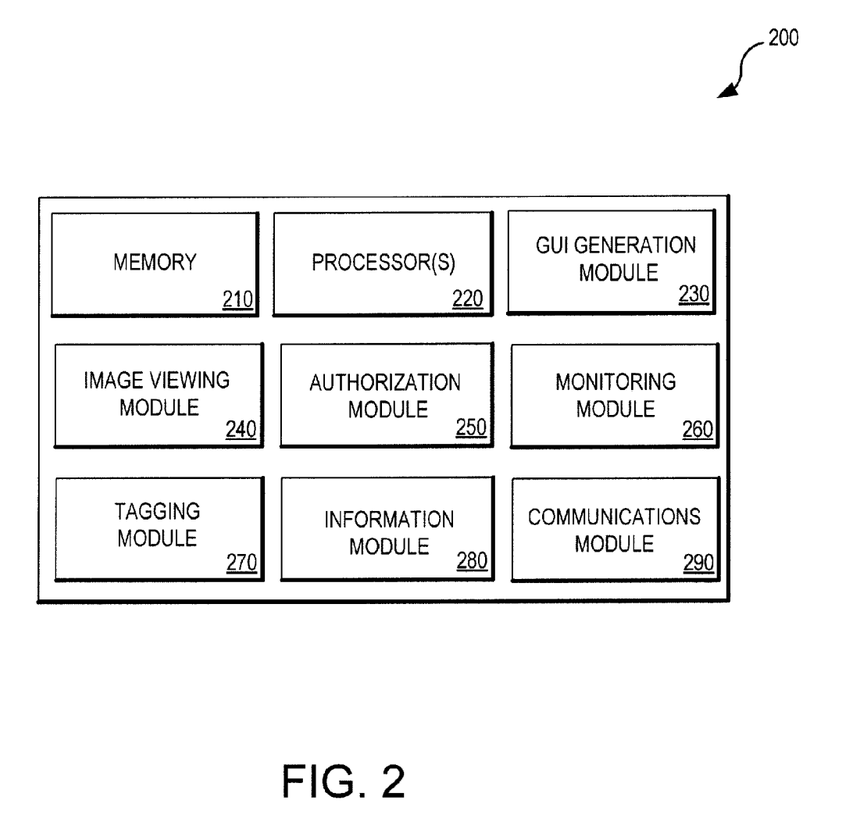
FIG. 2 shows a block diagram with exemplary components of a content tagging system in accordance with one or more embodiments of the present invention.

FIG. 2 shows block diagram 200 with exemplary components of a content tagging system in accordance with one or more embodiments of the present invention. According to the embodiments shown in FIG. 2, the content tagging system can include memory 210, one or more processors 220, graphical user interface (GUI) generation module 230, image viewing module 240, authorization module 250, monitoring module 260, tagging module 270, information module 280, and communications module 290. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, tagging module 270 can be separated into two or more modules for tagging different types of digital content.

Memory 210 can be any device, mechanism, or populated data structure used for storing information. In accordance with some embodiments of the present invention, memory 210 can encompass any type of, but is not limited to, volatile memory, nonvolatile memory and dynamic memory. For example, memory 210 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 220. For example, memory 210 could be used in one or more embodiments to house all or some of the instructions needed to execute the functionality of GUI generation module 230, image viewing module 240, authorization module 250, monitoring module 260, tagging module 270, information module 280, and communications module 290.

GUI generation module 230 can generate one or more GUI screens that allow for interaction with a user of the internet-based social network. In at least one embodiment, GUI generation module 230 generates a graphical user interface allowing a first user of the internet-based social network to request and view the personal profile, the digital image(s), and/or other digital content of a second user of the internet-based social network.

Image viewing module 240 receives a request from a user to view a digital image associated with another user. Image viewing module 240 can be communicably coupled to authorization module 250. When a request to view the digital content is received, image viewing module 240 uses authorization module 250 to determine if the requesting user is authorized to view the digital content. In some embodiments, authorization module 250 uses a set of viewing rules, possibly customized by the owner of the digital content, to generate an authorization indicator. The authorization indicator specifies if the requesting user is authorized to view the digital image of the owner. Image viewing module 240 uses the authorization indicator to decide whether or not to display the digital image(s) or other digital content being requested. If the requesting user is authorized, the digital content is displayed through a user interface screen generated by GUI generation module 230. If the requesting user is not authorized, the requesting user will be denied access to the digital content.

Monitoring module 260 receives and records viewing activity for the digital image(s) and/or other digital content included in each of the plurality of user accounts stored on user account database 140. The viewing activity can be recorded in one or more databases and can include an indicator of a user of the internet-based social network that viewed a digital image and/or other digital content. The viewing indicator can also indicate which of the one or more digital images and/or other digital content were viewed by other users, record current information about the viewer, or may record only enough information (e.g., a unique id within the social network) to derive the information about the viewer. In some cases, the viewing indicator may also include the number of views, a time stamp of when the image was viewed, an indicator of the amount of time of the viewing, a location of the viewer, an ip address of the viewer, if the digital image or digital content was downloaded, and/or indicators of other information such as if a comment was made.

Tagging module 270 receives and/or retrieves the recorded viewing activity of the digital image(s) and/or digital content and tags the digital image(s) and/or digital content with a viewer image of the user(s) that viewed the digital image(s) and/or digital content. In some embodiments, tagging module retrieves a viewer image set by the viewer. In other embodiments, the owner of the digital content being viewed may be able to select a viewer image for a viewer. As such, tagging module 270 would determine if an owner selected viewer image has been specified. Still yet, in other embodiments, tagging module 270 can create or select a viewer image based on a set of preferences or rules of either the owner of the digital content and/or the viewer.

Viewer images can be any representation of a user, such as a picture of a face of a user, a profile picture, an image, an icon, an avatar, or other on-screen representation. In accordance with various embodiments, tagging module 270 can place the viewer image(s) on the digital image(s) and/or digital content in a variety of ways. For example, the viewer images can be aligned in any fashion or pattern such as, but not limited to, around the perimeter, top, bottom, and/or side of digital image. In addition, some embodiments allow for the viewer images to be modified in one or more ways to convey additional information quickly to the owner. For example, in accordance with various embodiments the viewer images may be grouped, enlarged, shrunk, color coded, animated, have a transparency level imposed, have a color band or ring overlaid or surround the digital content, and/or arranged in certain patterns.

In some embodiments, tagging module 270 may present the viewer images in different sizes to indicate a viewing time relationship. In some cases, a first viewer image larger than a second viewer image indicates the user associated with first viewer image viewed the digital image more recently than the user associated with the second viewer image. Similarly, a transparency level can be imposed on the viewer image to indicate a viewing time relationship (e.g., a first viewer image more solid than a second viewer image indicates the user associated with first viewer image viewed the digital image more recently than the user associated with the second viewer image). Still yet, color rings surrounding the viewer image may be used to indicate a day of the week or hour at which the image was viewed. In other embodiments, the placement on viewer images can be used to indicate a viewing time (e.g., hour, day of the week, month, etc) or viewing time relationship.

Various embodiments of the present invention use tagging module 270 to display all of the viewer images until removed by the user while other embodiments only display the viewer images for only a limited time period or limited number of views by the owner. The viewer images for which the time period or number of views has passed are automatically removed by tagging module 270.

In one or more embodiments, the owner of the digital images and/or digital content is able to indicate (e.g., through a GUI selection screen generated by GUI generation module 230) which of the other users the owner would like to show up in the tagging. This creates a selected tagging group. In some embodiments, the viewer images of a selected tagging group are all shown on the photo or digital content in a first format, and then presented in a second format as each of the associated users views the photo or digital content. For example, the first format may be transparent to indicate that the user associated with the viewer image has not viewed the photo or digital content, but becomes solid when the user associated with the viewer image views the photo or digital content.

As another example, a group viewer image may be used to replace a set of viewer images within a certain category (e.g., family, friends, coworkers, custom group, etc) indicating that all of those users have viewed the image. Illustrating this idea, suppose the first user wanted to know when all of his family members have viewed a specific photo. The image can quickly become cluttered with multiple viewer images of users from a variety of groups making it difficult for the user to ascertain this information quickly. As such, a group viewer image can be created or used that indicates when all of the members of that group have viewed the image. In some embodiments, the group viewer image can have a modifiable property (e.g., the transparency level, color ring, etc) that changes as the number of members of the selected tagging group view the image (e.g., the group viewer image becomes less transparent as more members view the digital content).

Various embodiments allow for the multiple viewer image modifications and for image modifications in proportion, or inversely proportional, to the number of views. For example, a group viewer image may be transparent until all of the members of the group have viewed the photo or digital content. The group viewer image can be expanded in some cases when the first user interacts with the group viewer image. The expansion can include a display user viewer images, possibly modified as described above, indicating which a users have viewed (and possibly which have not viewed and a time relation of viewing of) the digital image or digital content.

Information module 280 gathers information about the user(s) that viewed the digital image(s) or other digital content from one of the plurality of user accounts that is associated with the each user. In accordance with some embodiments, information module 280 can embed a subset of this information into the viewer image. For example, information module 280 can embed a link in the viewer image to the personal profile of the user that viewed the digital image so that a selection of the viewer image will present the personal profile of the user that viewed the digital image. In other embodiments, information module 280 may retrieve information about the viewing user(s) from a database in response to interaction with a viewer image graphically overlaid on one of the one or more digital images of the first user.

Communications module 290, in accordance with some embodiments, sends the digital image with the viewer image of each user that viewed the digital image or other digital content to the owner. For example, communications module 290 may send the digital content to the user via e-mail. In various embodiments, the communications sent by communications module 290 are sent on a schedule (e.g., periodic, on-demand, user-specified, event triggered, etc).

Figure 3:
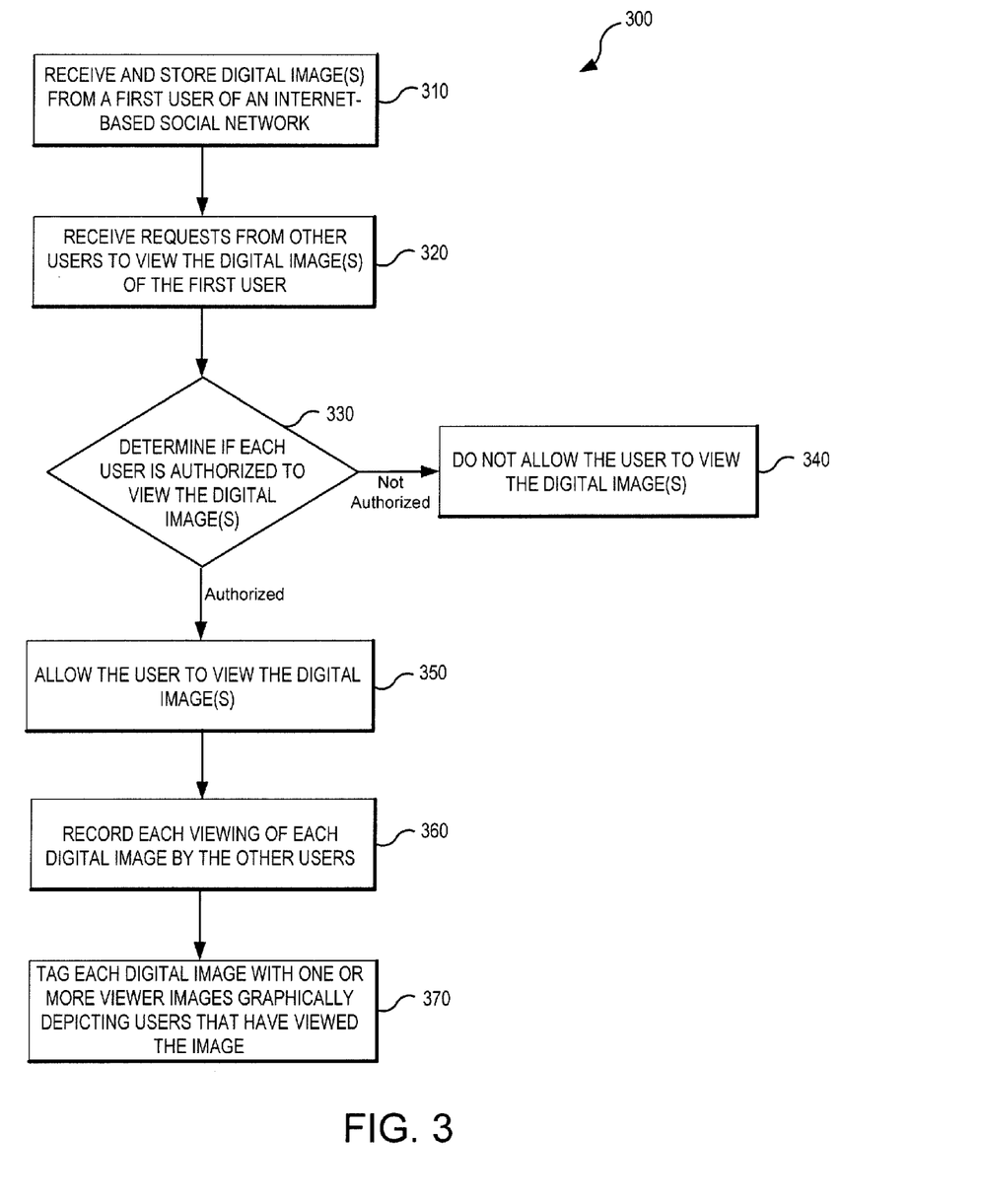
FIG. 3 is a flow chart illustrating exemplary operations for tagging digital content in accordance with various embodiments of the present invention.

FIG. 3 is a flow chart 300 illustrating exemplary operations for tagging digital content in accordance with various embodiments of the present invention. In accordance with the embodiments shown in FIG. 3, profile operation 310 receives and stores digital images and/or other digital content from a first user of an internet-based social network. In some embodiments, the first user can also set/adjust privacy controls that allow the first user to choose who can view their profile, view their digital content, contact them, etc.

Once the digital images and/or other content is stored, the digital images and/or other content can be made available through the social network allowing other users to request to view the digital images and/or other content. For example, a second user may click on a digital image or photo album within the first user's profile creating a viewing request. Requesting operation 320, receives the viewing requests from the other users. Once the viewing request is received, determination operation 330 determines if the requesting user is authorized to view the digital image(s) and/or digital content that are being requested. For example, determination operation 330 may use the settings within the privacy controls to determine if the requesting is authorized.

If determination operation 330 determines that the requesting user is not authorized to view the digital image(s) and/or digital content of the first user, then determination operation 330 branches to denial operation 340 where the requesting user is not allowed to view the digital images. One or more graphical user interface screens (e.g., that are generated by GUI generation module 230) can be displayed to inform the requesting user that they are not allowed to view the image. The graphical user interface screens can allow the requesting user to request authorization to view the content from the first user.

If determination operation 330 determines that the requesting user is authorized to view the digital image(s) and/or digital content of the first user, then determination operation 330 branches to viewing operation 350. Viewing operation 350 displays the digital image(s) and/or digital content of the first user. During each display of the digital image(s) and/or digital content, recording operation 360 records information about the viewing. For example, in some embodiments, viewing operation 350 records in a database a viewing indicator indicating which of the one or more digital images were viewed by other users. The viewing indicator may directly record current information about the user or may record only enough information (e.g., a unique id within the social network) to derive the information about the viewer. In some cases, the viewing indicator may also include the number of views, a time stamp of when the image was viewed, and/or indicators of other information such as if a comment was made.

From viewing operation 350 and recording operation 360, the digital image(s) or content that have been viewed and viewer information recorded, tagging operation 370 tags the digital image(s) and/or digital content with one or more viewer images that graphically depict the other users that have viewed the image(s) or other digital content the next time the creator or owner of the photo or other digital content visits the photo. As discussed above, the viewer image can be any representation of a user. Examples include, but are not limited to, a picture of a face of a user, a profile picture, an image, an icon, an avatar, or other on-screen representation.

In accordance with various embodiments, tagging operation 370 may be triggered in a variety of ways. In some embodiments, tagging operation 370 occurs after each view thereby distributing the computational impact over time. In other cases, the social network may set certain time periods for tagging operation 370 to be performed. For example, during off-peak times. Still yet, in other embodiments of the present invention, tagging operation 370 may be triggered by the first user (i.e., the owner of the content). Examples of triggers by the owner include, but are not limited to, viewing of an image or digital content, signing on to the social network or other platform, an on-demand request by the first user of who has viewed photos, a reoccurring request for periodic updates (e.g., hourly, daily, weekly, etc), request for periodic updates on a user-specified schedule, and others.

Figure 4:
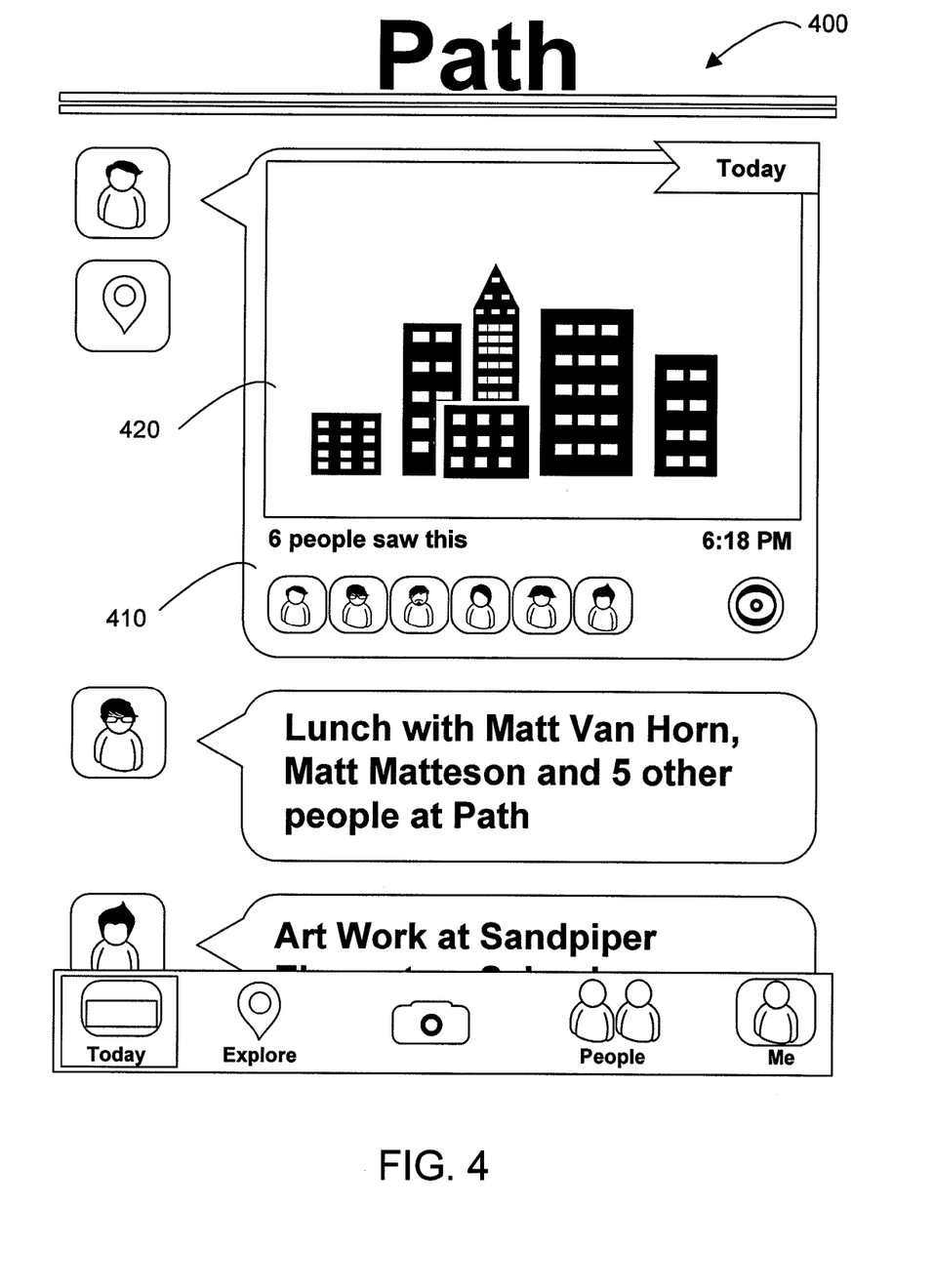
FIG. 4 illustrates a digital image tagged with viewer images representing other users that have viewed the digital image in accordance with some embodiments of the present invention.

FIG. 4 illustrates a modified digital image 400 tagged with viewer images 410 representing other users that have viewed digital image 420 in accordance with some embodiments of the present invention. The viewer images 410 illustrated on FIG. 4 are profile pictures of a user. However, viewer images 410 can be any representation of a user, such as a picture of a face of a user, a profile picture, an image, an icon, an avatar, or other on-screen representation.

The viewer images 410 in FIG. 4 are aligned along the bottom of digital image 420. However, the viewer images can be arranged in any fashion or pattern such as around the perimeter, top, bottom, and/or side of digital image 420. While not shown in FIG. 4, other embodiments of the present invention allow for the viewer images to be modified in one or more ways to convey additional information quickly to the first user as discussed above in FIG. 2. For example, in accordance with various embodiments the viewer images may be grouped, enlarged, shrunk, color coded, animated, have a transparency level imposed, and/or arranged in certain patterns.

Exemplary Computer System Overview

Figure 5:
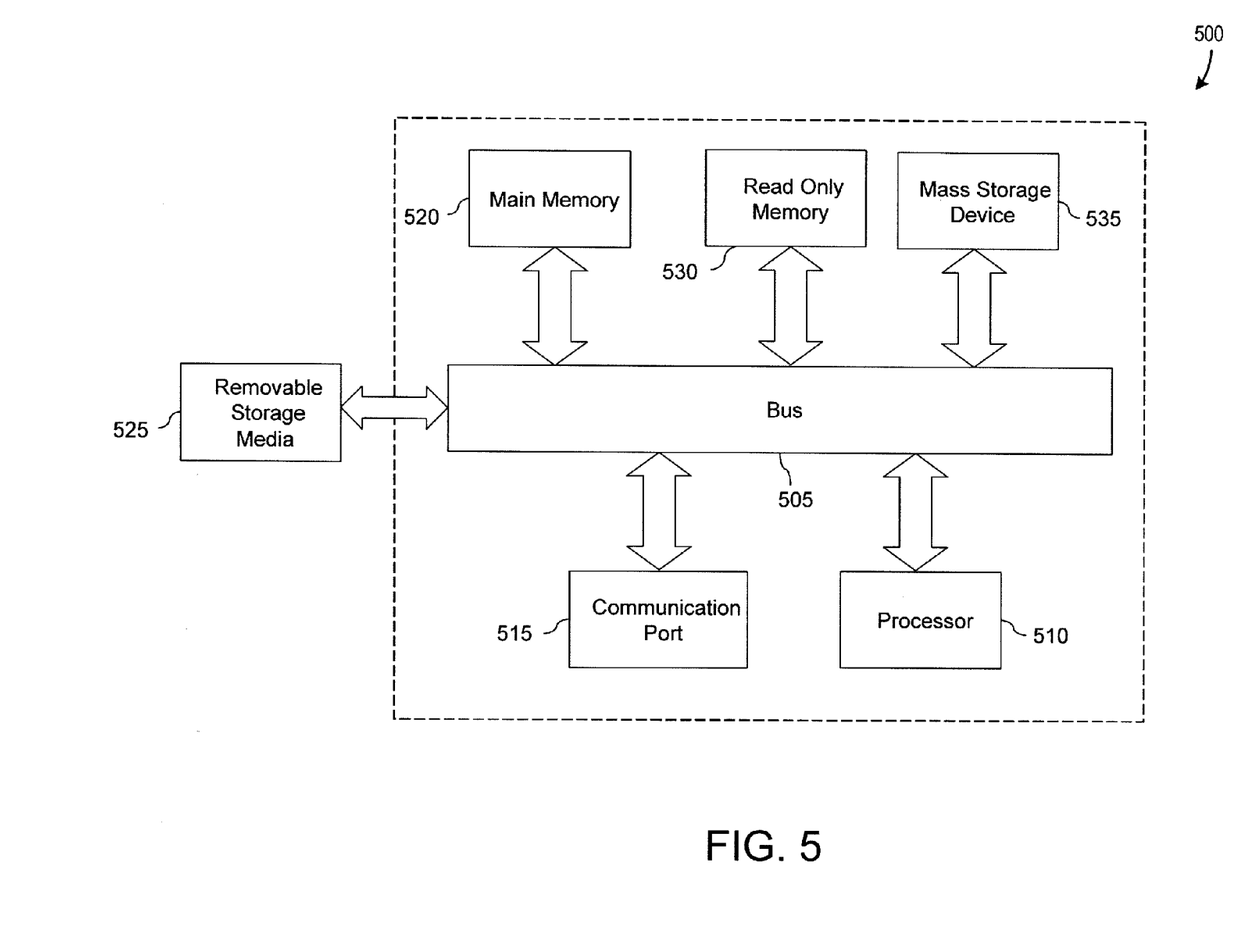
FIG. 5 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present invention may be utilized. According to the present example, the computer system includes a bus 505, at least one processor 510, at least one communication port 515, a main memory 520, a removable storage media 525, a read only memory 530, and a mass storage 535.

Processor(s) 510 can be any known processor, such as, but not limited to, an Intel® Itanium® or Itanium 2® processor(s), or AMD® Opteron® or Athlon MP® processor(s), or Motorola® lines of processors. Communication port(s) 515 can be any of an RS-232 port for use with a modem based dialup connection, a 10/100 Ethernet port, or a Gigabit port using copper or fiber. Communication port(s) 515 may be chosen depending on a network such a Local Area Network (LAN), Wide Area Network (WAN), or any network to which the computer system 500 connects.

Main memory 520 can be Random Access Memory (RAM), or any other dynamic storage device(s) commonly known in the art. Read only memory 530 can be any static storage device(s) such as Programmable Read Only Memory (PROM) chips for storing static information such as instructions for processor 510.

Mass storage 535 can be used to store information and instructions. For example, hard disks such as the Adaptec® family of SCSI drives, an optical disc, an array of disks such as RAID, such as the Adaptec family of RAID drives, or any other mass storage devices may be used.

Bus 505 communicatively couples processor(s) 510 with the other memory, storage and communication blocks. Bus 505 can be a PCI/PCI-X or SCSI based system bus depending on the storage devices used.

Removable storage media 525 can be any kind of external hard-drives, floppy drives, IOMEGA ZIP Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for tagging digital content. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
receiving and storing personal data of a first user of an internet-based social network, wherein the personal data of the first user includes a particular digital image;
receiving a request from a second user of the internet-based social network to view the particular digital image of the first user;
obtaining a viewer image of the second user including a visual indicator of the second user;
modifying the viewer image of the second user, the modification to the viewer image of the second user indicating information about the second user; and
graphically overlaying the modified viewer image of the second user on the particular digital image of the first user that was viewed by the second user.

2. The method of claim 1, further comprising:
receiving a request from a third user of the internet-based social network to view the particular digital image of the first user; and
graphically overlaying a second viewer image on the particular digital image of the first user that was viewed by the third user, wherein the second viewer image includes a visual indicator of the third user.

3. The method of claim 2, wherein the modified viewer image and the second viewer image are aligned around a perimeter of the particular digital image of the first user that was viewed by the second user and the third user.

4. The method of claim 1, further comprising:
receiving and storing personal data of the second user of the internet-based social network, wherein the personal data of the second user includes a profile picture or an avatar; and
wherein the viewer image includes the profile picture or the avatar of the second user.

5. The method of claim 1, further comprising recording in a database a viewing indicator indicating that the particular digital image was viewed by the second user.

6. The method of claim 1, further comprising displaying details of the second user in response to interaction with the viewer image graphically overlaid on the particular digital image of the first user.

7. The method of claim 1, further comprising displaying a personal profile page of the second user when the first user selects the viewer image graphically overlaid on the particular digital image of the first user.

8. The method of claim 1, wherein access of the second user to view the particular digital image of the first user is controlled by settings of the first user within the internet-based social network.

9. A system comprising:
a processor;
an account database having stored thereon a plurality of user accounts of an internet-based social network, wherein each of the plurality of user accounts include a personal profile and a digital image;
a monitoring module executable on the processor and configured to receive and record viewing activity for the digital image included in each of the plurality of user accounts, wherein the recorded viewing activity includes an indicator of a user of the internet-based social network that viewed the digital image;

a modification module executable on the processor and configured to modify a viewer image of the user that viewed the digital image, the modification to the viewer image of the user that viewed the digital image indicating information about the user that viewed the digital image;

a tagging module executable on the processor and configured to receive the recorded viewing activity of the digital image and tag the digital image with the modified viewer image of the user that viewed the digital image.

10. The system of claim 9, further comprising an information module executable on the processor and configured to gather information about the user that viewed the digital image from one of the plurality of user accounts that is associated with the user, and wherein the information module embeds a subset of this information into the viewer image.

11. The system of claim 10, wherein the information module embeds a link in the viewer image to the personal profile of the user that viewed the digital image so that a selection of the viewer image will present the personal profile of the user that viewed the digital image.

12. The system of claim 9, further comprising:
an image viewing module executable on the processor and configured to receive a request from a first user to view a digital image of a second user;
an authorization module communicably coupled to the image viewing module,
wherein the authorization module is executable on the processor and configured to receive the request and use a set of viewing rules to generate an authorization indicator if the first user is authorized to view the digital image of the second user; and
wherein the viewing module will display the digital image of the second user when the authorization indicator is received from the authorization module.

13. The system of claim 9, further comprising a communications module executable on the processor and configured to send the digital image with the viewer image of the user that viewed the modified digital image to a user associated with a user account associated with the digital image via email.

14. The system of claim 9, further comprising a graphical user interface generation module executable on the processor and configured to generate a graphical user interface allowing a first user of the internet-based social network to view a personal profile and a digital image of a second user of the internet-based social network.

15. The system of claim 9, wherein access of a second user to view a digital image of a first user is controlled by settings of the first user within the internet-based social network.

16. A non-transitory, tangible computer-readable storage medium containing a set of instructions to cause one or more processors to:
receive and store personal data of a first user of an internet-based social network, wherein the personal data of the first user includes a particular digital image;
receive a request from a second user of the internet-based social network to view the particular digital image of the first user;
obtain a viewer image of the second user including a visual indicator of the second user;
modify the viewer image of the second user, the modification to the viewer image of the second user indicating information about the second user; and
graphically overlay the modified viewer image of the second user on the particular digital image of the first user that was viewed by the second user.

17. The computer-readable storage medium of claim 16, wherein the set of instructions further cause the one or more processors to:
receive a request from a third user of the internet-based social network to view the particular digital image of the first user; and
graphically overlay a second viewer image on the particular digital image of the first user that was viewed by the third user, wherein the second viewer image includes a visual indicator of the third user.

18. The computer-readable storage medium of claim 17, wherein the set of instructions further cause the one or more processors to align the modified viewer image and the second viewer image around a perimeter of the particular digital image of the first user that was viewed by the second user and the third user.

19. The computer-readable storage medium of claim 16, wherein the set of instructions further cause the one or more processors to:
receive and storing personal data of the second user of the internet-based social network, wherein the personal data of the second user includes a profile picture or an avatar; and
wherein the viewer image includes the profile picture or the avatar of the second user.

20. The computer-readable storage medium of claim 16, wherein the set of instructions further cause the one or more processors to record in a database a viewing indicator indicating that the particular digital image was viewed by the second user.

21. The computer-readable storage medium of claim 16, wherein the set of instructions further cause the one or more processors to display details of the second user in response to interaction with the viewer image graphically overlaid on the particular digital image of the first user.

22. The computer-readable storage medium of claim 16, wherein the set of instructions further cause the one or more processors to display a personal profile page of the second user when the first user selects the viewer image graphically overlaid on the particular digital image of the first user.

23. The computer-readable storage medium of claim 16, wherein access of the second user to view the particular digital image of the first user is controlled by settings of the first user within the internet-based social network.

24. The method of claim 1, wherein modifying the viewer image comprises graphically overlaying at least a band of color over the viewer image.

25. The method of claim 1, wherein the modification indicates information about the second user other than the second user having viewed the particular digital image.

26. The system of claim 9, wherein modifying the viewer image comprises changing a transparency level of the viewer image.

27. The system of claim 9:
wherein modifying the viewer image comprises adding a band of color to the viewer image; and
wherein the modification indicates information about the user that viewed the particular digital image other than the user having viewed the particular digital image.

28. The computer-readable storage medium of claim 16, wherein the modification graphically indicates a day on which the second user viewed the particular digital image.

29. The computer-readable storage medium of claim 16, wherein the modification indicates a particular relationship between the first user and the second user over the internet-based social network.

* * * * *